July 15, 1969  R. M. STERNBERG  3,456,164
SOLENOID ENERGIZING MEANS
Filed May 23, 1966  2 Sheets-Sheet 1

INVENTOR
ROBERT M. STERNBERG
BY *Louis A. Kline*
*Albert H. Searley*
HIS ATTORNEYS

United States Patent Office 3,456,164
Patented July 15, 1969

3,456,164
SOLENOID ENERGIZING MEANS
Robert M. Sternberg, Dayton, Ohio, assignor to The National Cash Register Company, Dayton, Ohio, a corporation of Maryland
Filed May 23, 1966, Ser. No. 552,069
Int. Cl. H01h 47/32
U.S. Cl. 317—148.5                      10 Claims

ABSTRACT OF THE DISCLOSURE

Means for causing rapid solenoid energization. The solenoid winding is effectively divided into a number of windings on a common core. Power is first applied to a first winding having a relatively small number of turns, and is subsequently switched from the first winding to a second winding having a larger number of turns, which second winding may include the first winding as a part thereof. Switching of power from the first winding to the second winding is accomplished automatically by inclusion of a undirectional conducting device. A timing device may be used to control duration of application of power to the first winding.

---

This invention relates generally to solenoid energizing means, and more particularly relates to a solenoid energizing circuit capable of rapid energization of the solenoid.

As is well known, solenoids are used in many different types of electrical equipment to provide mechanical operations under the control of electrical circuitry. In certain types of high-speed data-processing devices, as well as in other applications, it is important that a solenoid be energized rapidly in response to a signal applied thereto by the electrical circuitry.

In the past, a common means of rapidly generating energizing flux in a magnetic device has been to apply initially to the winding a larger voltage and/or current than that needed to sustain the amount of flux required to maintain the device in energized condition, once energization has been achieved. Energizing speeds achieved using this type of arrangement are limited by the voltage, current, and power handling capabilities of the switching device used, as well as by the power supplies and other associated circuitry.

In the present invention, a different type of circuit from that described above is employed to produce rapid energization of a solenoid. In this circuit, the solenoid winding is effectively divided into a number of windings on a common core. To energize the solenoid, power is first applied to a winding having a relatively small number of turns. A high initial flux rise rate is thus obtained, which diminishes exponentally with respect to time. At some given point in time, power is switched from the first winding to a second winding having a larger number of turns, for the reason that the application of power to the larger number of turns produces a higher rate of flux rise at that time, and maintains the previously-established flux, with a lesser amount of current than that passing through the first-mentioned winding, as flux rise rate through said first-mentioned winding decreases. The second winding, having the larger number of turns, may include the previously-mentioned first winding as a part thereof in certain embodiments of the invention.

The effective switching of power from the first winding to the second winding, described above, is accomplished automatically, and at an advantageous time, by inclusion in the circuit of a unidirectional conducting device, as will subsequently be described in detail. In addition, a timing device may be utilized to control the duration of application of power to the first winding.

It is accordingly an object of the present invention to provide a novel and efficient solenoid energizing circuit.

An additional object is to provide a solenoid energizing circuit having a plurality of solenoid windings on a common core, and having circuit means for selective energization of these windings, to provide a rapid response in energization of the solenoid.

Another object is to provide a solenoid energizing circuit having a plurality of windings and a plurality of circuit paths for increasing the rapidity of solenoid energization.

A further object is to provide a solenoid energizing circuit having a plurality of circuit paths and a plurality of windings, and also having means to control the transfer of power application automatically from one path to another at such time as to increase the rapidity of solenoid energization.

Still a further object is to provide a solenoid energizing circuit having a plurality of windings, a plurality of circuit paths, a unidirectional conducting device in one of such circuit paths, and a plurality of switching means, with the unidirectional conducting device acting to control the transfer of power application automatically from one path to another at such time as to increase the rapidity of solenoid energization.

With these and other objects, which will become apparent from the following description, in view, the invention includes certain novel features of construction and combinations of parts, a plurality of forms or embodiments of which are hereinafter described with reference to the drawings which accompany and form a part of this specification.

Figure 1:
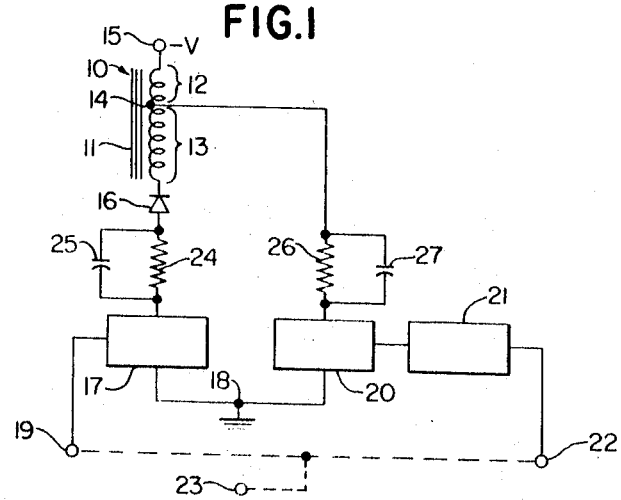
FIGS. 1, 2 and 3 are schematic diagrams of three different embodiments of solenoid energizing circuits.

The solenoid energizing circuit arrangement shown generally in FIG. 1 includes a solenoid 10 with an associated core 11. The solenoid is effectively divided into two windings 12 and 13 by a tap 14. As shown in FIG. 1, the winding 12 has a relatively small number of turns, while the winding 13 has a larger number of turns. However, in this embodiment, the relative number of turns in the two windings is not significant, since both of these windings are included in one of the two conducting paths, as will subsequently be described in greater detail, and the total number of turns is of course greater than the number of turns in either one of the individual windings. One end of the solenoid 10 is connected to a terminal 15, to which is applied a suitable source of potential. The other end of the solenoid 10 is connected over a unidirectional conducting device 16, a parallel combination of a resistor 24 and capacitar 25, and a switching means 17, which will be designated for convenience as the "hold" switching means, to a terminal 18, which is connected to a base reference potential, shown in FIG. 1 as ground. Operation of the "hold" switching means 17 is controlled by an input signal applied to a terminal 19.

From the tap 14, a second circuit path extends over a second parallel combination of a resistor 26 and a capacitor 27, and over a second switching means 20, which will be designated for convenience as the "boost" switching means, to the previously-mentioned terminal 18. Operation of the switching means 20 is controlled by a timing device 21, which is in turn controlled by an input signal applied to a terminal 22. The timing device 21 is of a well-known type, which is effective immediately upon being operated to transmit an input signal to the switching means 20, and which terminates said input signal after a predetermined duration, regardless of whether or not the input signal is maintained on the terminal 22.

If desired, a single signal applied to a terminal 23 can be transmitted over the terminals 19 and 22 to the switching means 17 and the timing device 21, as shown by the dashed lines in FIG. 1, to enable the entire solenoid energizing circuit to be controlled by a single input signal.

Figure 4:
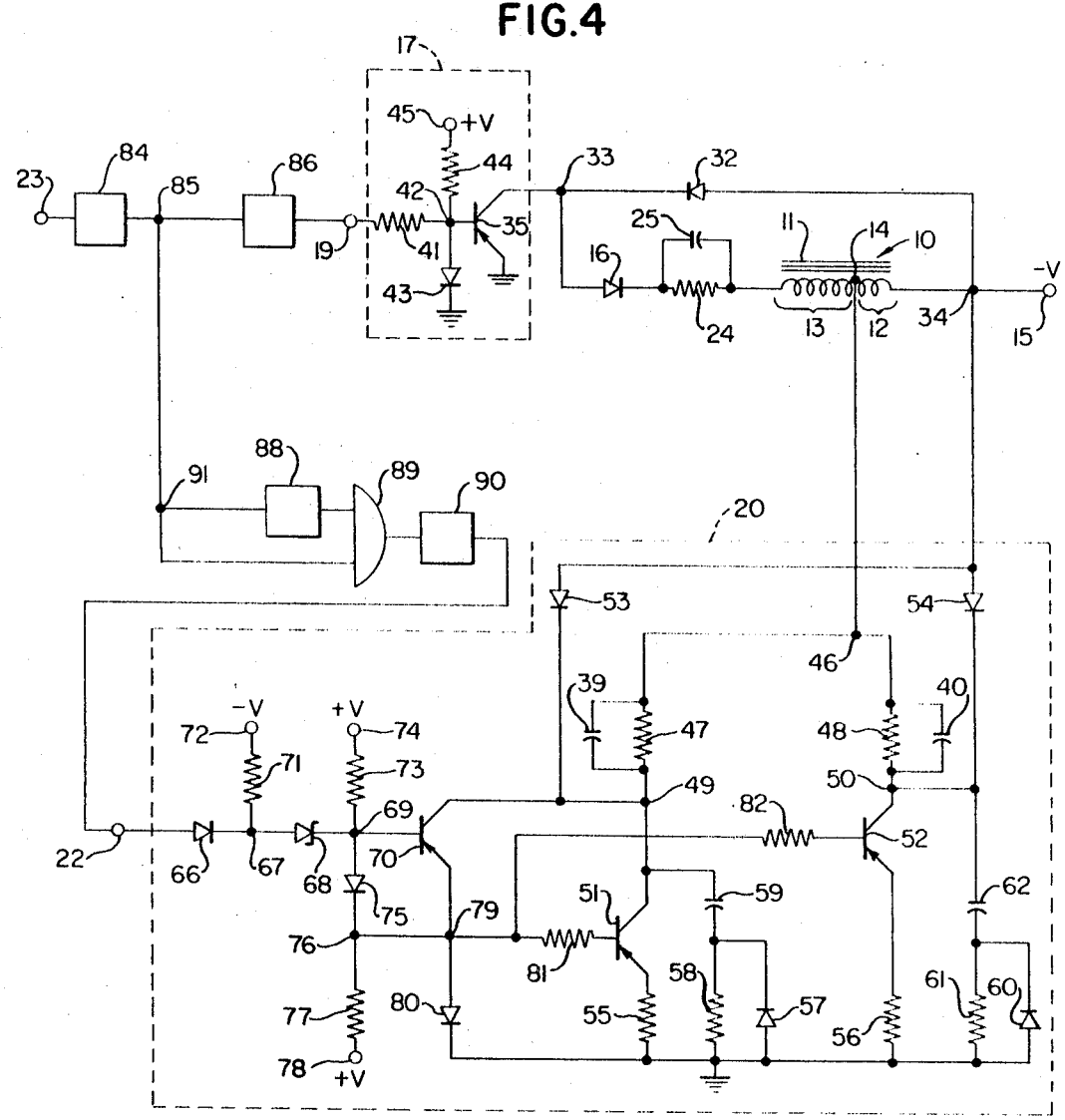
FIG. 4 is a detailed circuit diagram of the solenoid energizing circuit shown in FIG. 1.

Shown in FIG. 4 is a specific circuit embodiment of the circuit schematically shown in FIG. 1. In FIG. 4, certain elements which correspond directly to elements in FIG. 1 have the same reference characters applied thereto as are used in FIG. 1. A solenoid 10 having a core 11 is connected between a terminal 15, to which is applied a suitable source of potential, and a resistor 24, to the other end of which resistor is connected a unidirectional conducting device, shown as a diode 16. A capacitor 25 is connected in parallel with the resistor 24. The solenoid 10 is effectively divided into two windings 12 and 13 by a tap 14, with the two windings having a ratio of twenty turns in the winding 12 to one hundred eighy turns in the winding 13, in the illustrated embodiment. It will be understood that other turns ratios may be employed, depending upon the requirements of the circuit. A voltage suppression diode 32 is connected in parallel with a combination of the solenoid 10, the resistor 24 and capacitor 25, and the diode 16, between two points 33 and 34.

One energizing path for the solenoid 10 extends through the "hold" switching means, shown generally by the block 17 in FIGS. 1 and 4, and more specifically extends through a transistor 35 having its collector connected to the point 33, and having its emitter connected to the base reference potential, shown as ground. Conduction of the transistor 35 is controlled by a signal applied to its base. Such a signal is applied to the switching means 17 at the terminal 19, which terminal is connected over a resistor 41 and a point 42 to the base of the switching transistor 35. From the point 42, a first path extends over a clamping diode 43 to a base reference potential, shown as ground, and a second path extends over a resistor 44 to a terminal 45, to which a suitable source of potential is applied.

A second energizing path for the solenoid 10 extends through the "boost" switching means, shown generally by the block 20 in FIGS. 1 and 4. In order to increase the current carrying capacity of the "boost" switching means, two parallel switching paths are provided, each including a switching transistor and various resistive and capacitive elements associated therewith.

More specifically, the tap 14 is connected over a point 46, a pair of parallel current-limiting resistors 47, 48 in combination with capacitors 39 and 40, and is further connected over points 49 and 50 to the collectors of a pair of transistors 51 and 52 arranged in parallel to provide adequate conducting capability for the power applied to the twenty-turn portion 12 of the solenoid winding 10, as was mentioned above. Arc suppression diodes 53 and 54 are connected in parallel between the point 34 and the points 49 and 50. The emitters of the transistors 51 and 52 are connected over resistors 55 and 56 to a base reference potential, shown as ground. Conduction of the transistors 51 and 52 is controlled by signals applied to their bases, as will subsequently be more fully described.

A network connected between the base reference potential and the collector of the transistor 51 protects said transistor from excessive voltage by establishing a maximum voltage level at the collector. Said network consists of a parallel combination of a diode 57 and a resistor 58 connected in series with a capacitor 59. A similar network consisting of a diode 60, a resistor 61, and a capacitor 62 is employed to protect the transistor 52.

An input signal for operating the switching means 20 by controlling the conduction of the transistors 51 and 52 is applied to the input terminal 22. The terminal 22 is connected over an isolating diode 66, a point 67, a Zener diode 68, and a point 69 to the base of a transistor 70. From the point 67, a path extends over resistor 71 to a terminal 72, to which is applied a source of suitable potential. From the point 69, a first path extends over a resistor 73 to a terminal 74, to which a suitable source of potential is applied, while a second path extends over a diode 75, a point 76, and a resistor 77 to a terminal 78, to which a suitable source of potential is applied.

The collector of the transistor 70 is connected to the point 49 in the collector circuit of the transistor 51, and the emitter of the transistor 70 is connected over a point 79 and a diode 80 to a base reference potential, shown as ground. From the point 79, a first path extends to the previously-mentioned point 76, while two parallel paths extend over resistors 81 and 82 to the bases of the switching transistors 51 and 52.

In the circuit as shown in FIG. 4, the two input terminals 19 and 22 for the "hold" and "boost" switching means 17 and 20 are connected by a logical circuit arrangement in such a way that a single input signal applied to the input terminal 23 controls both of the switching means 17 and 20. The particular arrangement of logic shown in FIG. 4 has been designed for a specific use in connection with a high-speed paper tape reader, but it is obvious that other arrangements could be developed by one skilled in the art for operating the switching means 17 and 20 either with a single input signal or with separate input signals, according to the special requirements of a device with which the solenoid energizing circuit is utilized.

As shown in FIG. 4, a first input signal conducting path extends from the terminal 23 over a logic inverter 84, a point 85, and a power inverter 86 to the input terminal 19 for the "hold" switching means 17. The inverters may be of any suitable conventional design for inverting the input signal. A second path extends from the point 85 over a point 91 to the input terminal 22 for the "boost" switching means 20 over a combination of logic components which includes a one-shot or monostable multivibrator 88, an AND gate 89, and a power inverter 90. Two paths extend from the point 91, with one going directly to one input of the AND gate 89, while the other provides an input for the one-shot 88, the output of which one-shot is applied to the other input of the AND gate. The output of the AND gate 89, in turn, is inverted by the power inverter 90 and applied to the terminal 22.

The mode of operation of the solenoid energizing circuit shown generally in FIG. 1 and more specifically in FIG. 4 will now be described. It will be assumed that the signal input terminal 23 is connected to the terminals 19 and 22 for the "hold" and "boost" switching means 17 and 20 in the manner shown in FIG. 4, so that only one input signal is required for operation of the circuit. It will also be assumed that the switching means 17 and 20 are in an open or nonconducting condition, so that the solenoid 10 is not energized.

An input signal applied to the terminal 23 is first inverted by the inverter 84 and then continues over the point 85 to be inverted by the inverter 86 and applied to the terminal 19 of the "hold" switching means 17. Said signal is also transmitted over the branch extending from the point 85 to the point 91, from which it is applied over a first path to the one-shot 88, and over a second path to one input of the AND gate 89. The signal applied to the one-shot 88 is effective to trigger it and cause a signal of given duration (500 microseconds in the illustrated embodiment) to be produced and applied to the other input of the AND gate 89. The output of the AND gate is inverted by the power inverter 90 and is applied to the terminal 22 of the "boost" switching means 20. The use of the combination of an AND gate with the one-shot permits the "boost" switching means 20 to be turned off instantaneously in response to a change in input signal applied to the terminal 23. This would not be possible if the path from the terminal 23 to the terminal 22 extended only through the one-shot 88, since the signal applied to the terminal 22 would then have a duration of 500 microseconds, regardless of the duration of the signal applied to the terminal 23.

When an input signal is applied to the terminal 23, signals are simultaneously impressed on the terminals 19 and 22, over the logic network previously described, and cause the transistor 35 in the "hold" switching means 17 and the transistors 51 and 52 in the "boost" switching means 20 to be biased for conduction. As the transistors 51 and 52 conduct, the twenty-turn winding 12 of the solenoid 10 is rapidly energized. The rapidity of energization is enhanced by the resistor-capacitor combinations 47, 39 and 48, 40. Due to conduction through the switching means 20, the potential at the tap 14 is caused to go to ground, which the potential at the end of the solenoid 10 nearest the resistor 24 becomes positive with respect to ground, due to counter-EMF, or transformer action. This reverse-biases the diode 16 and prevents completion of an energizing path for the winding 13 of the solenoid 10 through the transistor 35 of the "hold" switching means 17.

Thus when the input signals are first applied to the terminals 19 and 22 to turn on the switching means 17 and 20, all of the current flows through the path including the "boost" switching means 20 and the winding 12 for developing flux in a path including the core 11. As the flux rise rate generated by application of current through the winding 12 diminishes, the voltage induced in the solenoid 10 by the flux change also diminishes. Therefore, at some given point in time during energization of the solenoid 10, when the rate of flux rise has sufficiently diminished, the reverse bias is removed from the diode 16, and the conduction path is established from the terminal 15 over the entire solenoid 10, the resistor 24 in combination with the capacitor 25, the diode 16 and the transistor 35 to ground. The resistor-capacitor combination of the resistor 24 and the capacitor 25 enhances the speed of energization of the solenoid 10.

The application of power to the entire solenoid 10 now produces a higher rate of flux rise than the continued energization only of the winding 12 would have, and does so with a lesser amount of current than that passing only through the winding 12 of the solenoid 10.

It may also be noted that use of the diode 16 provides a self-regulating means for switching from the "boost" conducting path to the "hold" conducting path at an advantageous or optimum time, since the switching takes place at the time when the reverse biasing of the diode is terminated, and it is at this time that the solenoid 10 as a whole is able to impart a flux rise rate equal to or greater than that caused by the winding 12.

Figure 2:
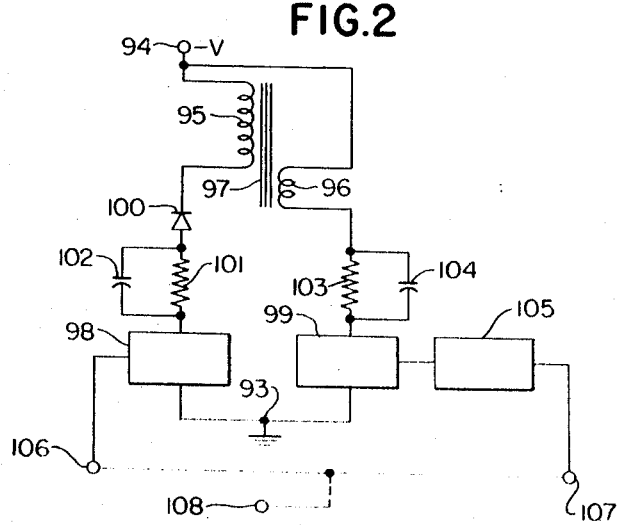

Shown in FIG. 2 is a second embodiment of the invention, in which current flow through separate solenoid windings 95 and 96 applied to the same core 97 between a terminal 94 and a terminal 93 connected to a base reference potential shown as ground is controlled by a "hold" switching means 98 and a "boost" switching means 99, respectively. It will be noted from the drawing that the winding 95 has a substantially larger number of turns than the winding 96. As in FIG. 1, a diode 100 is included in the circuit path containing the winding 95 and the "hold" switching means 98. A parallel combination of a resistor 101 and a capacitor 102 is connected in the circuit path between the diode 100 and the "hold" switching means 98, while a similar parallel combination of a resistor 103 and a capacitor 104 is connected between the winding 96 and the "boost" switching means 99. These resistor-capacitor combinations are used to increase the speed of energization of the windings, as has been previously mentioned. A timing device 105 is provided to control operation of the "boost" switching means 99. The switching means 98 and the timing device 105 are controlled by input signals applied to terminals 106 and 107, respectively, which signals may be transmitted from a terminal 108 connected to both of the terminals 106 and 107. The switching means 98 and 99 and the timing device 105 may be of the types shown in detail in FIG. 4, if desired.

The circuit of FIG. 2 operates in the same manner as the circuit of FIG. 1, even though the windings 95 and 96 are in separate parallel paths, since they are associated with the same core 97, and the voltage induced in the winding 95 by energization of the winding 96 is therefore effective to reverse-bias the diode 100 to prevent current flow through the winding 95 until the rate of flux rise generated by the winding 96 has substantially declined. The timing device 105 shown in FIG. 2 functions in the same manner as the timing device 21 described in connection with the showing of FIG. 1.

Figure 3:
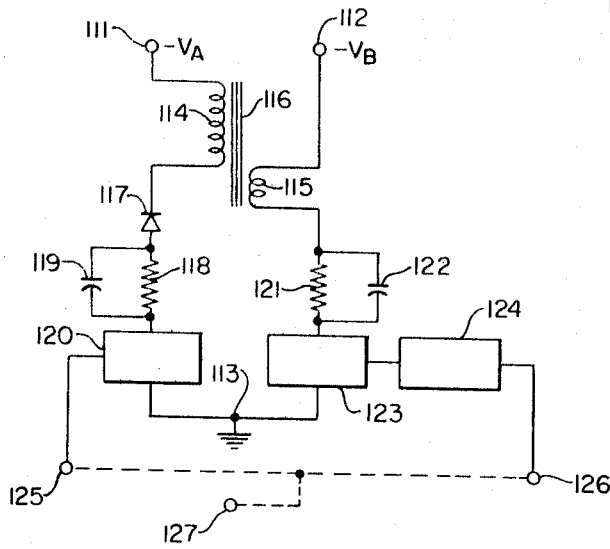

A further embodiment of the invention is shown in FIG. 3, and resembles the embodiment shown in FIG. 2, except that separate power terminals 111 and 112, and a common terminal 113 connected to a base reference potential shown as ground, are provided for windings 114 and 115, respectively, which are applied to the same core 116. It will be noted from the drawing that the winding 114 has a substantially larger number of turns than the winding 115. The energizing path for the winding 114 extends from the terminal 111 over said winding, a diode 117, a parallel combination of a resistor 118 and a capacitor 119, and a "hold" switching means 120 to the terminal 113, while the energizing path for the winding 115 extends from the terminal 112 over said winding, a parallel combination of a resistor 121 and a capacitor 122, and a "boost" switching means 123 to the terminal 113. The switching means 123 is controlled by a timing device 124, similar to the timing device 21 shown in FIG. 1. Input terminals 125 and 126 are provided for the application of input signals capable of operating the "hold" switching means 120 and the timing device 124, respectively. If desired, the switching means 120 and the timing device 124 may be operated by a single signal applied to a terminal 127 connected to the two terminals 125 and 126. The switching means 120 and 123, and the timing device 124, may be of the type shown in FIG. 4.

The operation of the circuit of FIG. 3 is basically the same as the operation of the circuits of FIGS. 1 and 2, even though separate power supplies are used in the embodiment of FIG. 3, since the windings 114 and 115 are associated with the same core 116, and the voltage induced in the winding 114 by energization of the winding 115 is therefore effective to reverse-bias the diode 117 to prevent current flow through the winding 114 until the rate of flux rise generated by the winding 115 has substantially declined.

It will be recognized that in the circuits of FIGS. 2 and 3, as well as in the circuit of FIG. 1, the timing device associated with the "boost" switching means is not essential to operation of the energizing circuit, and could be omitted if desired.

While the forms of the invention shown and described herein are admirably adapted to fulfill the objects primarily stated, it is to be understood that it is not intended to confine the invention to the forms or embodiments disclosed herein, for the invention is susceptible of embodiment in various other forms, within the scope of the appended claims.

What is claimed is:

1. In an electrical circuit for controlling the operation of solenoid means, the combination comprising:
  first and second electromagnetic windings having a common core element;
  means for applying electrical power to said windings;
  unidirectional conducting means serially connected to said first winding;
  first switching means connected serially with said unidirectional conducting means and said first winding, and operable by the application of a signal to an input means of said first switching means to complete a first path for energizing said first winding; and second switching means connected serially with said second winding, and operable by the application of a signal to an input means of said second switching means to complete a second path for energizing said second winding, whereby the simultaneous application of input signals to the input means of said first and second switching means causes both the first and second switching means to complete energizing paths, with said first energizing path being rendered initially ineffective due to reverse biasing of the unidirectional conducting means in that path by voltage induced in the core element when said second winding is energized over said second path, the reverse bias subsequently being removed as the rate of flux rise in said second winding diminishes, to permit energization of said first winding through said first path.

2. The circuit of claim 1, also including timing means associated with said second switching means, and operable to provide an input signal of predetermined duration to said second switching means.

3. The circuit of claim 2, in which the timing means includes a monostable multivibrator and an AND gate, with an input signal to the timing means being applied directly to one input of the AND gate and also being applied to the monostable multivibrator, with the output of the monostable multivibrator being applied to a second input of the AND gate, whereby an input signal to the timing means causes an input of predetermined duration to the second switching means, except when the duration to the second switching means, except when the duration of the input signal to the timing means is less than the duration of the signal generated by the monostable multivibrator, in which event the input signal to the second switching means is the same duration as the input signal to the timing means.

4. The circuit of claim 1 in which the input means of the first and second switching means are electrically connected so that a single input signal is effective to operate both of said switching means.

5. The circuit of claim 1 in which the first and second switching means include transistors for performing the switching function.

6. The circuit of claim 1 in which a combination of resistive and capacitive elements is included in at least one of the first and second paths to increase the speed of energization of the windings.

7. The circuit of claim 1 in which the first and second electromganetic windings are connected in series with each other, with said second switching means being connected to the junction of the first and second windings.

8. The circuit of claim 1 in which said first winding has a substantially larger number of turns than said second winding.

9. The circuit of claim 8 in which the first and second electromagnetic windings are connected in parallel with each other and are supplied from a common power supply.

10. The circuit of claim 8 in which the first and second electromagnetic windings are supplied from separate power supplies.

References Cited
UNITED STATES PATENTS

| | | | |
|---|---|---|---|
| 3,277,348 | 10/1966 | Trush | 317—155.5 X |
| 3,361,939 | 1/1968 | Smith | 317—155 |
| 3,403,302 | 9/1968 | Mason | 317—148.5 |

LEE T. HIX, Primary Examiner

U.S. Cl. X.R.

307—273; 317—155, 155.5